US005336411A

United States Patent [19]

Andersson

[11] Patent Number: 5,336,411

[45] Date of Patent: Aug. 9, 1994

[54] HYDROCYCLONE ASSEMBLY

[75] Inventor: Roine Andersson, Järfälla, Sweden

[73] Assignee: Celleco Hedemora AB, Stockholm, Sweden

[21] Appl. No.: 934,503

[22] PCT Filed: Apr. 29, 1991

[86] PCT No.: PCT/SE91/00301

§ 371 Date: Oct. 20, 1992

§ 102(e) Date: Oct. 20, 1992

[87] PCT Pub. No.: WO91/16987

PCT Pub. Date: Nov. 14, 1991

[30] Foreign Application Priority Data

May 7, 1990 [SE] Sweden ............................ 9001635-3

[51] Int. Cl.[5] ............................................. B01D 21/26

[52] U.S. Cl. .............................. 210/512.1; 210/512.2; 55/459.1

[58] Field of Search .......................... 210/512.1, 512.2; 209/144, 211; 55/459.1

[56] References Cited

U.S. PATENT DOCUMENTS 3,959,150 5/1976 Frykhult et al. ................. 210/512.1
4,146,469 3/1979 Kaiser et al. ......................... 201/211
4,650,584 3/1987 Macierewicz .................... 210/512.2
4,655,923 4/1987 Leone .............................. 210/512.2
5,096,587 3/1992 Charette ........................... 210/512.2
5,221,476 6/1993 Papetti et al. .................... 210/512.2

FOREIGN PATENT DOCUMENTS 2074682 12/1981 United Kingdom .

*Primary Examiner*—Robert A. Dawson
*Assistant Examiner*—David Reifsnyder
*Attorney, Agent, or Firm*—Davis Hoxie Faithfull & Hapgood

[57] ABSTRACT

A hydrocyclone assembly comprises at least one hydrocyclone (1) having at least two through flow members (2, 3) for distribution of liquid between the outside and the interior of the hydrocyclone, and circular cylindrical pipes (4, 5) of the same number as that of the through flow members of the hydrocyclone, the through flow members of the hydrocyclone being connected to the pipes, respectively. According to the invention each through flow member (2, 3) defines an annular end portion (6), which extends around a radial bore (7) in its associated pipe (4, 5) and abuts sealingly against the mantle surface of the pipe via a gasket (8) extending around said bore in the pipe.

3 Claims, 1 Drawing Sheet

HYDROCYCLONE ASSEMBLY

The present invention relates to a hydrocyclone assembly comprising at least one hydrocyclone having at least two through flow members for distribution of liquid between the outside and the interior of the hydrocyclone, and circular cylindrical pipes of the same number as that of the through flow members of the hydrocyclone. The through flow members of the hydrocyclone are connected to the pipes, respectively.

In known hydrocyclone plants including hydrocyclone assemblies of this kind the through flow members of the hydrocyclones are connected to the circular cylindrical pipes via connection pieces on these. Since there are often hundreds of hydrocyclones in one and the same hydrocyclone plant the fabrication of the connection pieces on the circular cylindrical pipes is relatively costly, among other things because the pipes usually are made of stainless steel. Thus, the connection pieces have to be attached to the pipes by welding.

The object of the present invention is to reduce the cost for connection of the through flow members of the hydrocyclones to the circular cylindrical pipes in the hydrocyclone assemblies.

This object is obtained by means of a hydrocyclone assembly of the kind initially stated, which mainly is characterized in that each through flow member defines an annular end portion, which extends around a radial bore in its associated pipe and abuts sealingly against the mantle surface of the pipe via a gasket extending around said bore in the pipe.

The need for arranging connection pieces on the pipes is eliminated, which reduces the cost for the fabrication of the new hydrocyclone assembly as compared to known hydrocyclone assemblies.

According to a preferred embodiment of the hydrocyclone assembly according to the invention the through flow members of the hydrocyclone comprises an inlet through flow member for a liquid mixture to be separated, and an outlet through flow member for a created liquid fraction. Further, the circular cylindrical pipes comprise a supply pipe for supplying said liquid mixture to the hydrocyclone, and a discharge pipe for discharging said created liquid fraction from the hydrocyclone. The end portion of the inlet through flow member extends around a radial bore in the supply pipe and abuts sealingly against the mantle surface of the supply pipe via a gasket extending around said bore in the supply pipe, and the end portion of the outlet through flow member extends around a radial bore in the discharge pipe and abuts sealingly against the mantle surface of the discharge pipe via a gasket extending around said bore in the discharge pipe.

Figure 1:
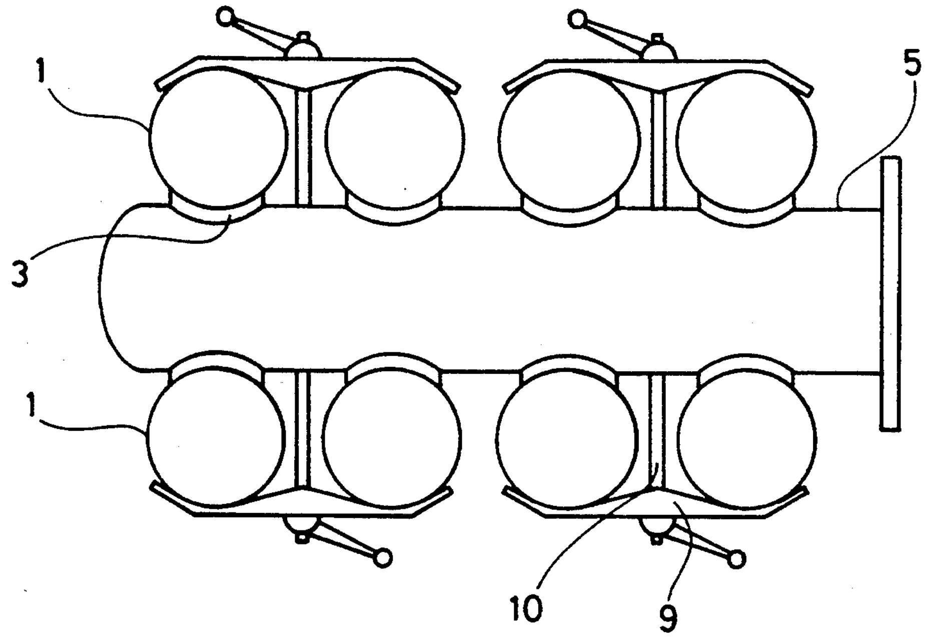
Figure 2:
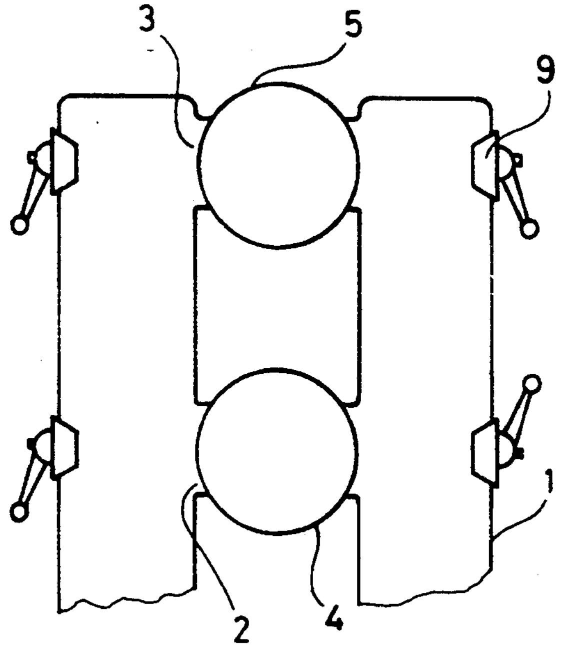
Figure 3:
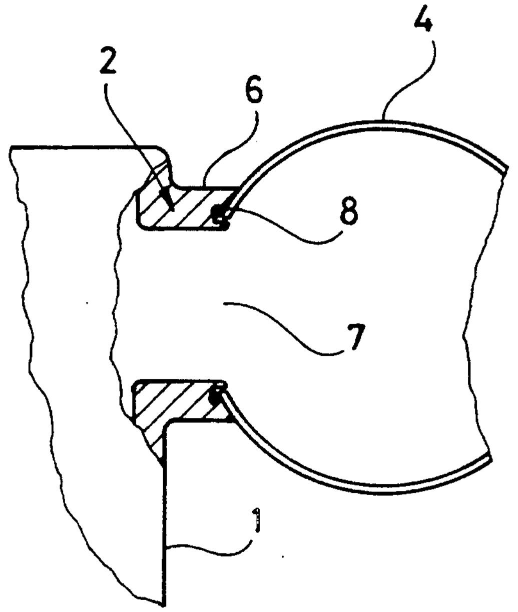

The invention is explained more closely in the following with reference to the accompanying drawing, in which FIG. 1 shows a view of a hydrocyclone assembly according to the invention, FIG. 2 shows in part another view of the hydrocyclone assembly according to FIG. 1, and FIG. 3 shows in part a section through a detail of the hydrocyclone assembly according to the invention.

The hydrocyclone assembly shown in FIGS. 1 and 2 comprises eight hydrocyclones 1, which are arranged in parallel in two rows, each row having four hydrocyclones 1.

Each hydrocyclone 1 has an inlet member 2 for a liquid mixture to be separated, and an outlet member 3 for a created accept fraction. (Each hydrocyclone also has an outlet member for a created reject fraction, which is not shown in the drawing). All of the eight hydrocyclones 1 have their inlet members connected to a circular cylindrical pipe. 4 for supplying said liquid mixture, and their outlet members 3 connected to a circular cylindrical pipe 5, for discharging the accept fractions from the hydrocyclones 1. The pipes 4 and 5 are arranged in parallel. The hydrocyclones 1 are made of plastic material, whereas the pipes 4 and 5 are made of stainless steel.

Each inlet member 2 defines an annular end portion 6 extending around a radial bore 7 in the pipe 4 and abutting sealingly against the mantle surface of the pipe 4 via a gasket 8, which extends around the bore 7 (FIG. 3). Correspondingly, an annular end portion of each outlet member 3 extends around a radial bore in the pipe 5 and abuts sealingly against the mantle surface of the pipe 5 via a gasket.

The eight hydrocyclones 1 are clamped in pairs against the pipes 4 and 5 by attachment means in the form of arms 9 and clamping bars 10. Each clamping bar 10 is made of steel and is welded to any of the pipes 4, 5.

The fabrication of the pipes 4 and 5 will be simple since only four boring operations per pipe are required to create eight radial passages through each pipe for connection of eight inlet or outlet members.

I claim:

1. A hydrocyclone assembly comprising at least one hydrocyclone, cylindrical pipes having outer surfaces for the conveyance of liquid to and from said hydrocyclone, through flow members extending between the hydrocyclone and the pipes, means for attaching the hydrocyclone to the pipes by clamping the through flow members to the pipes, each of said pipes having a radial bore connected to each flow member and each flow member having an annular wall extending around the radial bore of the pipe to which it connects, and a gasket extending around the bore to seal the connection between the annular wall and the outer surface of the pipe.

2. A hydrocyclone assembly as claimed in claim 1 wherein the through flow members are formed integrally with the hydrocyclone.

3. A hydrocyclone assembly as claimed in claim 1 or claim 2 wherein the through flow members comprise an inlet member for a liquid mixture to be separated and an outlet member for a liquid fraction generated in said hydrocyclone, and the cylindrical pipes comprise a supply pipe for supplying said liquid mixture and a discharge pipe for discharging said liquid fraction, the annular walls of the inlet and outlet members extending around the radial bores of the supply pipe and discharge pipe, respectively.

* * * * *